United States Patent Office 3,328,179
Patented June 27, 1967

3,328,179
WAX POLISHING COMPOSITION
Albert Gathman, Belmar, and Edward P. Cashman, Bayonne, N.J., assignors to Esso Research and Engineering Company, a corporation of Delaware
No Drawing. Filed May 1, 1964, Ser. No. 364,307
7 Claims. (Cl. 106—10)

The present invention relates to a solvent-type wax composition. In general, it concerns a solution or paste solvent-type wax composition which possesses a very slow solvent evaporation rate. In particular, it concerns a composition consisting of a mixture of at least two paraffin waxes and an isoparaffinic solvent.

Solvent-type wax compositions known in the prior art have a common disadvantage. These compositions, for example, the commercial wax pastes used for shoe polishes, furniture polishes, car polishes etc., lose the solvents contained therein through rapid evaporation if the covers of the containers in which they are held are left opened for any appreciable length of time. A hard unusable mass remains after the solvent has evaporated. The present invention overcomes this disadvantage and provides a solvent-type wax composition which has a very slow rate of evaporation making the composition exhibit, for instance, extremely good storage stability.

The solvent-type wax composition of this invention consists of a combination of at least two paraffin waxes and an isoparaffinic solvent.

Paraffinic waxes suitable for use in the present invention occur naturally in crude petroleum. The combination of paraffin waxes employed may be any combination of at least two paraffin waxes provided the combination has a melting point in the range of about 126 to 146° F., preferably about 140 to 144° F. Examples of suitable combinations of paraffin waxes useful in the present invention include but are not limited to (a) a combination consisting of 20 to 80 vol. percent of a fully refined paraffin wax having a typical melting point of 123° F. and a distillation range of 65 Fahrenheit degrees (e.g. a commercially available product sold under the trade name Essowax 2210) and 80 to 20 vol. percent of a fully refined paraffin wax having a typical melting point of 151° F. and a distillation range of 70 Fahrenheit degrees (e.g. a commercially available product marketed under the trade name Essowax 5010); (b) a combination consisting of about 25 vol. percent of a paraffin wax having a melting point of 110° F. and about 75 vol. percent of a fully refined paraffin wax having a typical melting point of 151° F. and a distillation range of 70 Fahrenheit degrees (e.g. Essowax 5010). A preferred combination of paraffin waxes suitable for use in this invention consists of a mixture of about 40 vol. percent Essowax 2210 and 60 vol. percent Essowax 5010.

Isoparaffinic solvents suitable for use in the composition in the present invention are mixtures of synthetic hydrocarbons obtained, for example, from alkylation and fractionation processes. The isoparaffinic solvent will consist of at least 50 vol. percent isoparaffins; preferably, at least 75 vol. percent isoparaffins and, more preferably, at least 90 vol. percent isoparaffins. The remainder of the isoparaffinic solvent (i.e. in addition to the isoparaffins) will comprise, primarily, other saturated hydrocarbons, for example, normal paraffins and naphthenic compounds. The isoparaffinic solvent will contain less than about 2 vol. percent aromatics; preferably, less than 0.5 vol. percent aromatics. In addition, a suitable isoparaffinic solvent will have ASTM D-86 distillation range of from about 320 to 410° F., preferably, 345 to 380° F. It is contemplated that any isoparaffinic solvent or mixture of isoparaffinic solvents which fulfills the above requirements may be employed. A preferred isoparaffinic solvent for use in the present invention is herein identified as Isoparaffinic Solvent "A" and has the following typical inspection:

ISOPARAFFINIC SOLVENT "A"

Typical Inspections:
    Distillation °F. IBP _____ 348
        5% _____ 350
        10% _____ 351
        50% _____ 356
        90% _____ 364
        95% _____ 368
        Dry point _____ 370
        FBP _____ 376
    Flash, Tag C.C., °F. _____ 125
Hydrocarbon types:                    Volume percent
    Total paraffins _____ 93.8
    1 ring naphthenes _____ 5.9
    2 ring naphthenes _____ 0.1
    Aromatics _____ 0.2
    Kauri butanol value _____ 27.3

The solvent type wax composition of the present invention comprises about 5 to 30 wt. percent, preferably about 20 wt. percent of the combination of isoparaffinic waxes hereinbefore described and about 70 to 95 wt. percent, preferably about 80 wt. percent of the isoparaffinic solvent hereinbefore described. The composition will at low wax concentrations, e.g. about 5% wax, be a solution, while at higher wax concentrations, e.g. about 20 wt. percent wax, it will be a paste.

The preparation of the solvent-type wax compositions of the present invention will be apparent to those skilled in the art. The composition may be prepared, for example, by simple blending of the paraffinic waxes with the isoparaffinic solvent and simple heating of the system in order to achieve solution. In general, a temperature in the range of about 120 to 130° F. is sufficient. The temperature should not be allowed to get too high because the wax odor degrades.

The wax compositions of the present invention may be used in many applications. It is contemplated that their prime application will be as a base for polishing compositions, for example, shoe polishes, furniture polishes, car polishes, etc. The composition may be employed in any application wherein a solvent-type paraffinic wax composition with a melting point in the range of about 126 to 146° F. has been heretofore employed.

In order to demonstrate the utility and the efficacy of the solvent-type wax composition of the present invention, several comparative tests were performed. In these tests the compositions of the present invention were compared with other wax compositions prepared from different waxes and/or different solvents. For example, microcrystalline waxes and other paraffinic waxes were tested, as were commercial solvents other than isoparaffinic solvents such as mineral spirits and turpentine. In the first series of tests, Composition A, a composition of the present invention, was prepared and ten grams of the resulting wax solution was placed in an aluminum dish at ambient temperature (e.g. 77° F.) and its rate of solvent evaporation was recorded and compared to the rate of solvent evaporation from 10 gram samples (in aluminum dishes at ambient temperatures) of Compositions B, C, D and E. The results of this series of tests are shown in Table I.

TABLE I

| Composition | Wax (20 wt. percent) | Solvent (80 wt. percent) | Weight of Solvent Evaporated After— | | |
|---|---|---|---|---|---|
| | | | 1 Day | 7 Days | 28 Days |
| A | Z | Isoparaffinic Solvent "A" | 1.8 | 1.9 | 6.3 |
| B | Z | Varsol 1 | 9.1 | 81.3 | 99.4 |
| C | Z | Varsol 2 | 16.2 | 82.5 | 98.1 |
| D | Z | Varsol 3 | 18.8 | 91.3 | 100.0 |
| E | Y | Isoparaffinic Solvent "A" | 6.6 | 68.1 | 96.9 |

Wax Z was a combination of 60 vol. percent of a highly refined paraffin wax having a melting point of about 151° F. and a distillation range of 70 F°. and 40 vol. percent of a highly refined paraffin wax having a melting point of about 123° F. and a distillation range of about 65 F°. The combination had a melting point of about 140° F.

Wax Y was a highly refined paraffin wax having a melting point of about 143° F. and a distillation range of about 55 F°.

Varsol 1 is a petroleum aliphatic solvent containing about 15 vol. percent aromatics and having a distillation range of about 320 to 387° F.

Varsol 2 is similar to Varsol 1 but containing about 30 vol. percent aromatics and having a distillation range of about 326 to 398° F.

Varsol 3 is similar to Varsol 1 but containing about 10 vol. percent aromatics and having a distillation range of about 318 to 354° F.

The results in Table I show the importance in the present invention of the use of an isoparaffinic solvent and further show the importance of using a combination of paraffinic waxes (Composition A) as compared to a single paraffinic wax (Composition E).

A second series of tests was performed to evaluate the evaporation rate of various solvents from various waxes and wax blends. In this series of tests, 2 grams of wax solution at room temperature were placed in an aluminum dish and the wt. percent solvent evaporation was noted after 1, 7 and 28 days. The results of this series of tests are shown in Table II.

TABLE II

| | Weight Percent | | | | | | | | | | | | | | |
|---|---|---|---|---|---|---|---|---|---|---|---|---|---|---|---|
| Varsol 1 | 80 | | 80 | | 80 | | 80 | | 80 | | 80 | | 80 | 40 | |
| Isoparaffinic Solvent "A" | | 80 | | 80 | | 80 | | 80 | | 80 | | 80 | | 40 | 40 |
| Turpentine: | | | | | | | | | | | | | | | |
| Wax X | 20 | 20 | | | | | | | | | | | | | |
| Wax W | | | 20 | 20 | | | | | | | | | | | |
| Wax Z | | | | | 20 | 20 | | | | | | | | 20 | 20 |
| Wax V | | | | | | | 20 | 20 | | | | | | | |
| Wax U | | | | | | | | | 20 | 20 | | | | | |
| 20/80 Vol. percent Wax V/U | | | | | | | | | | | 20 | 20 | | | |
| 80/20 Vol. percent Wax V/U | | | | | | | | | | | | | 20 | | |

| | Weight Percent Evaporation | | | | | | | | | | | | | | |
|---|---|---|---|---|---|---|---|---|---|---|---|---|---|---|---|
| 1st Day | 91.9 | 48.6 | 8.6 | 3.8 | 16.0 | 3.8 | 51.9 | 23.2 | 14.0 | 8.9 | 10.1 | 6.3 | 37.0 | 6.8 | 6.3 | 6.3 |
| 7th Day | 99.6 | 99.9 | 61.4 | 11.9 | 86.6 | 14.4 | 100 | 99.0 | 53.6 | 34.8 | 59.1 | 24.6 | 99.1 | 39.5 | 93.7 | 31.3 |
| 28th Day | 99.7 | 100 | 73.8 | 41.3 | 98.5 | 53.5 | 100 | 100 | 90.7 | 72.4 | 96.6 | 50.5 | 99.9 | 98.9 | 100 | 75.0 |

Wax U was highly refined paraffin wax having a melting point of about 151° F. and a distillation range of about 70 Fahrenheit degrees.
Wax V was a highly refined paraffin wax having a melting point of about 123° F. and a distillation range of about 65 Fahrenheit degrees.
Wax W was a combination of 25 vol. percent of a paraffin wax having a melting point of about 110° F. and 75 vol. percent of Wax U.
Wax X was high quality microcrystalline wax having a melting point of about 145° F.
Wax Z is same composition as in table I.

The results shown in Tables I and II demonstrate the unexpectedly superior solvent evaporation properties obtained by the use of a solvent-type wax composition consisting of a combination of at least two paraffinic waxes and an isoparaffinic solvent, according to the present invention.

What is claimed is:

1. A solvent-type wax composition comprising about 5 to 30 wt. percent of a combination of at least two paraffinic waxes, said combination having a melting point in the range of about 126 to 146° F.; and about 70 to 95 wt. percent of an isoparaffinic solvent, said solvent containing at least 50 vol. percent isoparaffins, less than 2 vol. percent aromatics and having an ASTM D-86 distillation range of about 320 to 410 Fahrenheit degrees.

2. A solvent-type wax composition as defined by claim 1 wherein said combination has a melting point in the range of about 140 to 144° F.; and said solvent contains at least 75 vol. percent isoparaffins.

3. A solvent-type wax composition as defined by claim 1 wherein said combination has a melting point of about 140° F.; and said solvent contains at least 90 vol. percent isoparaffins.

4. A solvent-type wax composition comprising about 20 wt. percent of a combination of two paraffinic waxes said combination having a melting point in the range of about 126 to 146° F.; and about 80 wt. percent of an isoparaffinic solvent, said solvent containing at least 50 vol. percent isoparaffins, less than 2 vol. percent aromatics, and having an ASTM D-86 distillation range of about 345 to 380 Fahrenheit degrees.

5. A solvent-type wax composition as defined by claim 4 wherein said combination of two paraffinic waxes consists of (a) about 80 to 20 vol. percent of a paraffin wax having a melting point of about 151° F. and a distillation range of 70 Fahrenheit degrees and (b) about 20 to 80 vol. percent of a paraffin wax having a melting point of about 123° F. and a distillation range of about 65 Fahrenheit degrees.

6. A solvent-type wax composition as defined by claim 4 wherein said combination of two paraffinic waxes consists of (a) about 60 vol. percent of a paraffin wax having a melting point of about 151° F. and a distillation range of 70 Fahrenheit degrees and (b) about 40 vol. percent of a paraffin wax having a melting point of about 123° F. and a distillation range of about 65 Fahrenheit degrees.

7. A solvent-type wax composition as defined by claim 1 wherein said combination of two paraffinic waxes consists of (a) about 80 to 20 vol. percent of a paraffin wax having a melting point of about 151° F. and a distillation range of 70 Fahrenheit degrees and (b) about 20 to 80 vol. percent of a paraffin wax having a melting point of about 123° F. and a distillation range of about 65 Fahrenheit degrees.

References Cited

UNITED STATES PATENTS

| | | | |
|---|---|---|---|
| 2,157,625 | 5/1939 | Page | 106—270 |
| 2,439,021 | 4/1948 | Quigg | 260—683.4 |
| 2,561,816 | 7/1951 | Pabst et al. | 106—271 |

ALEXANDER H. BRODMERKEL, *Primary Examiner.*

MORRIS LIEBMAN, T. MORRIS, *Assistant Examiners.*